Dec. 29, 1931.  E. L. SWARTZ  1,838,238
TRAILER HITCH
Filed Aug. 12, 1930  2 Sheets-Sheet 1
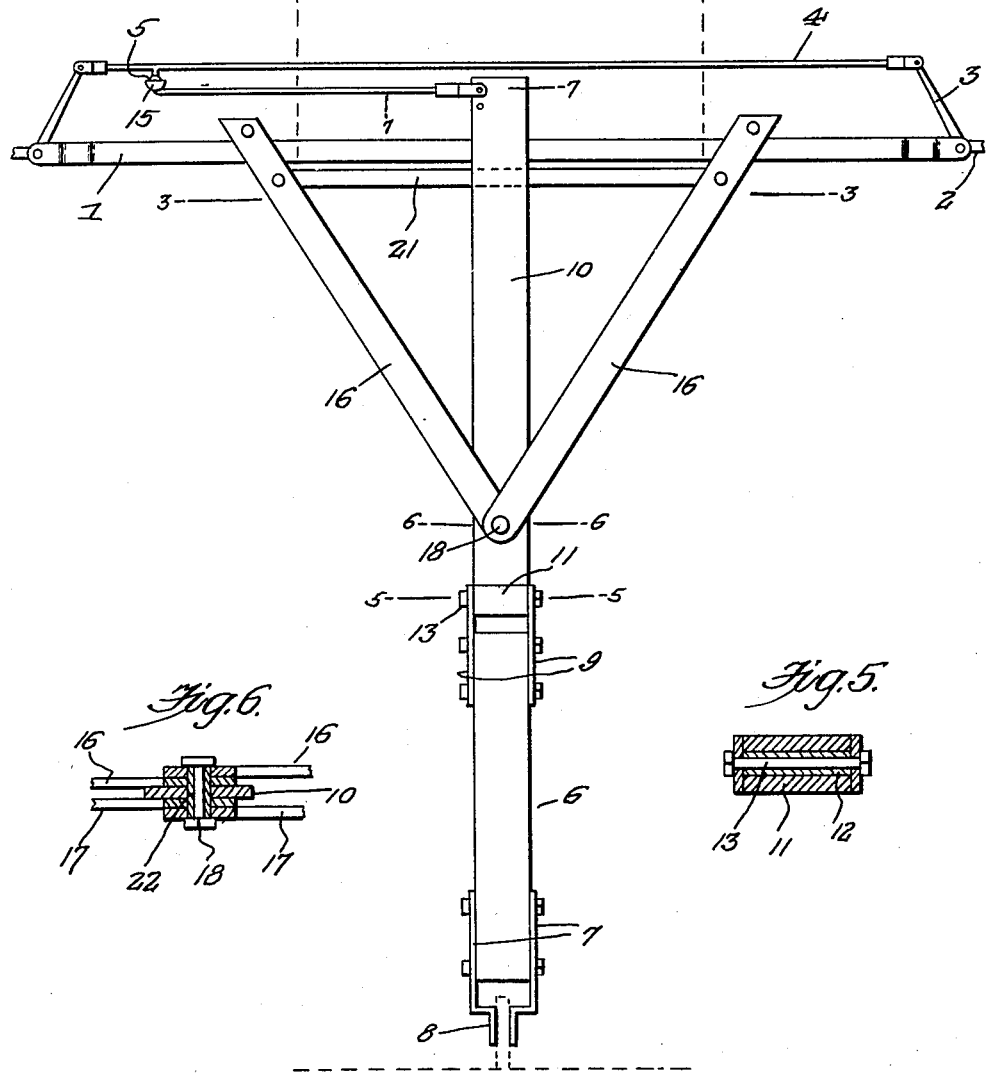
Inventor
Edward L. Swartz,
By 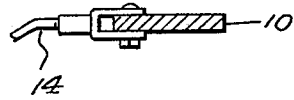
Attorney

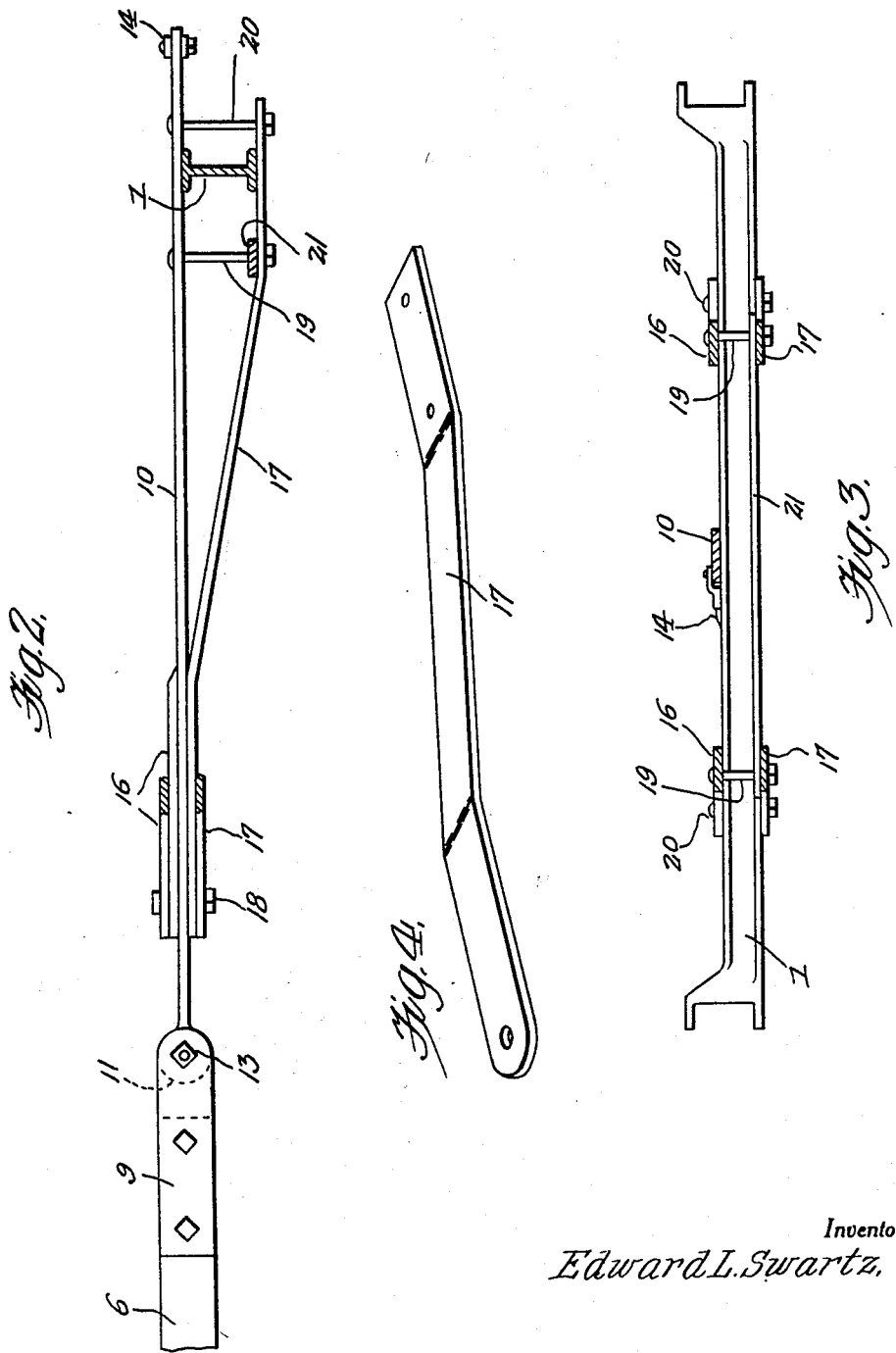

Patented Dec. 29, 1931

1,838,238

UNITED STATES PATENT OFFICE

EDWARD L. SWARTZ, OF MIRANDO CITY, TEXAS

TRAILER HITCH

Application filed August 12, 1930. Serial No. 474,685.

This invention relates to a trailer hitch and particularly to a device of this character for use in connection with a well known make of automobile and has for its primary object to provide, in a manner as hereinafter set forth, a trailer hitch embodying a novel construction and arrangement of parts whereby same may be expeditiously connected to the trailer and when so connected will function in a manner to turn the front wheels of said trailer to cause same to follow the towing vehicle around curves.

Other objects of the invention are to provide a trailer hitch of the character described which will be simple in construction, strong, durable, efficient in use and may be manufactured at low cost.

All of the foregoing and still further objects and advantages of the invention may become apparent from a study of the following specification, taken in connection with the accompanying drawings, wherein characters of like reference designate corresponding parts throughout the several views, and wherein:

Figure 1 is a top plan view of a trailer hitch constructed in accordance with this invention, showing same operatively connected to a trailer steering apparatus, Figure 2 is a view in longitudinal section of the device, Figure 3 is a cross sectional view taken substantially on the line 3—3 of Figure 1 looking in the direction indicated by the arrows, Figure 4 is a detail perspective view showing one of the lower braces, Figure 5 is a sectional view taken substantially on the line 5—5 of Figure 1, Figure 6 is a sectional view taken substantially on the line 6—6 of Figure 1, Figure 7 is a detail sectional view taken substantially on the line 7—7 of Figure 1.

Referring to the drawings in detail, it will be seen that the reference numeral 1 designates the front axle of a well known make of automobile which constitutes the trailer or which may be modified to constitute a trailer, said axle having pivotally mounted on its opposite ends for swinging movement in the usual manner in a horizontal plane the spindles 2 portions only of which are shown. Arms 3 extend from the spindles 2 and are connected together by the tie rod 4. The tie rod 4 is reversed in a manner to dispose the ball 5 between said rod 4 and the axle 1.

A tongue 6 has mounted on its opposite vertical sides on its forward end portion the metallic plates 7 which extend forwardly of the tongue 6 and terminates in the inwardly offset free end portion 8 for connection with a towing vehicle. Metallic strips 9 are secured on the opposite vertical sides of the tongues 6 and extend rearwardly therefrom for pivotal connection with the elongated metallic bar 10 having a hinge eye 11 on its forward end disposed between the strips 9. As best seen in Figure 5 of the drawings, a bushing 12 is mounted in the eye 11 and a pivot bolt 13 extends through the bushing and the strips 9. The bar 10 extends rearwardly over the axle 1 and terminates between said axle and the tie rod 4. The rear end portion of the bar 10 is provided with a plurality of apertures adjacent one of the longitudinal sides of said bar and pivotally connected thereto through the medium of the apertures is the rod 14. One end of the rod 14 is pivotally connected to the bar 10, as before explained, and the opposite end of said rod 14 is provided with a suitable socket 15 for the reception of the ball 5 on the tie rod 4.

In this manner the bar 10 is operatively connected to the tie rod 4. Pairs of rearwardly diverging upper and lower braces 16 and 17 respectively are secured on upper and lower sides of the bar 10 adjacent the eye 11 as at 18. The upper braces 16 of each pair extend over the axle 1 and the lower pair extend beneath the braces 17 of each pair extend beneath the braces 16 and under the axle 1. For this purpose the lower braces 17 are downwardly offset as illustrated to advantage in Figures 2 and 4 of the drawings. The pairs of braces are clamped to the axle 1 in spaced relation to the bar 10 on opposite sides of said bar through the medium of the bolts 19 and 20.

The bolts 19 also pass through opposite end portions of the transverse strut 21 which parallels the axle 1 adjacent the forward side of said axle and constitutes means for rigidly maintaining the pairs of braces in uniformly spaced relation with respect to each other. As seen in Figure 6 of the drawings, the bolt 18 which connects the forward ends of the braces 16 and 17 to the bar 10 passes through a bushing 22.

In use, when the towing vehicle turns as in going around a curve the tongue 6 will swing the bar 10 in a horizontal plane on the braces 16 and 17, said braces 16 and 17 constituting means for supporting the bar 10 on the axle 1. When the bar 10 is swung in a horizontal plane the tie rod 4 will be shifted through the medium of the rod 14 to swing the spindles 2 in an obvious manner.

The hinged connection between the tongue 6 and the bar 10 permits swinging movement of the tongue 6 in a vertical plane independently of the bar 10.

It is believed that the many advantages of a trailer hitch constructed in accordance with this invention will be readily understood, and although the preferred embodiment of the invention is as illustrated and described, it is to be understood that changes in the details of construction may be had which will fall within the scope of the invention as claimed.

What is claimed as new is:

A trailer hitch of the character described comprising forwardly converging pairs of upper and lower supporting bars rigidly connected to the front axle of the trailer at spaced points on said axle, the upper bars of each pair being engaged with the upper side of the axle and the lower bars of each pair being engaged with the lower side of the axle, said lower bars being provided with upwardly offset forward end portions, a steering bar pivotally connected, at an intermediate portion between the forward end portions of the upper bars of each pair and the forward end portions of the lower bars of each pair and extending forwardly therefrom, a tongue hingedly connected for swinging movement in a vertical plane to the forward end of the steering bar, bolts extending between the upper and lower bars of each pair forwardly and rearwardly of the axle for rigidly clamping the pairs of bars to said axle, a strut extending between the pairs of bars and having its end portions disposed between the upper and lower bars constituting each pair, said strut being disposed in parallelism with the axle and having its end portions apertured, the forwardmost bolts extending through the apertures in the end portions of the strut, said strut providing means for retaining the rear end portions of the pairs of bars in predetermined spaced relation, the steering bar extending rearwardly for swinging movement in a horizontal plane above the axle and the strut, and a rod operatively connecting the rear end portion of the steering bar to the steering apparatus of the trailer.

In testimony whereof I affix my signature.

EDWARD L. SWARTZ.